US012593162B2

(12) United States Patent
Struckman et al.

(10) Patent No.: US 12,593,162 B2
(45) Date of Patent: Mar. 31, 2026

(54) EARBUD HOUSING APPARATUS AND METHOD OF MANUFACTURING

(71) Applicants: William Struckman, Fayetteville, NC (US); Michael Vinson Edwards, Helena, MT (US)

(72) Inventors: William Struckman, Fayetteville, NC (US); Michael Vinson Edwards, Helena, MT (US)

( * ) Notice: Subject to any disclaimer, the term of this patent is extended or adjusted under 35 U.S.C. 154(b) by 248 days.

(21) Appl. No.: 18/135,988

(22) Filed: Apr. 18, 2023

(65) Prior Publication Data

US 2024/0357273 A1 Oct. 24, 2024

(51) Int. Cl.
*H04R 1/10* (2006.01)

(52) U.S. Cl.
CPC ......... *H04R 1/1066* (2013.01); *H04R 1/1016* (2013.01); *H04R 1/1075* (2013.01); *H04R 2201/105* (2013.01)

(58) Field of Classification Search
CPC ...... H04R 1/10; H04R 1/1016; H04R 1/1066; H04R 25/652; H04R 2225/025
See application file for complete search history.

(56) References Cited

U.S. PATENT DOCUMENTS 2,430,229 A * 11/1947 Kelsey ................. H04R 25/656 381/313
4,852,177 A * 7/1989 Ambrose ............. H04R 1/1016 381/337
5,917,918 A 6/1999 Callahan
6,438,244 B1 8/2002 Juneau et al.
7,916,888 B2 * 3/2011 Sapiejewski ......... H04R 1/2842 381/370
8,249,287 B2 * 8/2012 Silvestri ................. H04R 1/105 381/370
8,333,260 B1 * 12/2012 Hall ..................... H04R 1/1016 381/328
8,340,310 B2 * 12/2012 Ambrose ............. H04R 1/1091 381/328
8,391,534 B2 * 3/2013 Ambrose ................. H04R 1/10 128/864
8,971,545 B2 * 3/2015 Epping ................ H04R 1/1016 381/328
8,989,424 B2 * 3/2015 Sibbald ................ H04R 1/1091 381/373
9,179,211 B2 * 11/2015 Kirkpatrick .......... H04R 1/1016
9,258,663 B2 * 2/2016 Aase .................... H04R 1/1058
9,451,353 B2 * 9/2016 Kirkpatrick .......... H04R 1/1016
9,848,257 B2 * 12/2017 Ambrose ............. H04R 1/1016
9,980,031 B2 * 5/2018 Witt ....................... H04R 1/023
10,595,111 B2 * 3/2020 Ring ...................... H04R 9/025
(Continued)

FOREIGN PATENT DOCUMENTS

CN 115668976 A * 1/2023 ............. G10K 11/22
EP 1032243 A2 * 8/2000 ........... H04R 1/1058

*Primary Examiner* — Ryan Robinson
(74) *Attorney, Agent, or Firm* — Porzio, Bromberg & Newman, P.C.

(57) ABSTRACT

An earbud housing apparatus and method of manufacture for entirely encapsulating a speaker assembly within a single unit earbud housing. A plurality of flanges permanently fixed inside a multi-point inner ear lock create a hearing protection and sound adapter. The hearing protection and sound adapter is permanently fixed to the speaker assembly to form the complete earbud housing apparatus.

20 Claims, 12 Drawing Sheets

(56) References Cited

U.S. PATENT DOCUMENTS

| | | | | |
|---|---|---|---|---|
| 10,728,648 | B2 * | 7/2020 | Kirkpatrick .......... | H04R 1/1058 |
| 10,820,088 | B2 * | 10/2020 | Zalisk .................. | H04R 1/1016 |
| 2008/0152163 | A1 * | 6/2008 | Mulvey ................ | H04R 1/1016 381/74 |
| 2008/0226114 | A1 * | 9/2008 | Thompson ........... | H04R 1/1016 381/380 |
| 2015/0264467 | A1 * | 9/2015 | Annunziato ......... | H04R 1/1058 381/380 |
| 2016/0261944 | A1 * | 9/2016 | Silvestri ............... | H04R 1/2826 |
| 2018/0270558 | A1 * | 9/2018 | Ring .................... | H04R 1/1075 |
| 2023/0164472 | A1 * | 5/2023 | Keady .................. | H04R 1/1016 381/380 |

* cited by examiner

EARBUD HOUSING APPARATUS AND METHOD OF MANUFACTURING

FIELD OF THE INVENTION

The invention relates to an earbud housing apparatus and method of manufacture for entirely encapsulating a speaker assembly within an earbud housing.

DESCRIPTION OF THE RELATED ART

Hearing aid instruments encapsulated in soft polymeric materials are known. U.S. Pat. No. 6,438,244 discloses a hearing aid instrument including a plate member with electronic hearing aid components mounted thereto. The plate member is a harder material such as hard plastic. A soft polymeric body is bonded to the plate member and encapsulates the electronic hearing aid components. The body is soft and is shaped to conform to the ear canal of the user. The soft polymeric body and encapsulated electronic hearing aid components define a soft structure compliant to the ear canal during use. Earbuds made by hot plastic injection into tooling molds for making shells of the housing unit that are placed together after the speaker is fitted between these pieces have high manufacture costs.

U.S. Pat. No. 5,917,918 describes an in-ear-canal audio receiver including an in-ear-canal adapter body having a tapered ear plug portion that is inserted into the user's ear canal. The adapter body has an opening in the plug portion, an exterior annular indent, and an inner chamber coupled to the opening of the plug portion. The inner chamber of the in-ear-canal adapter body holds a transducer assembly comprising a transducer housing and a transducer or speaker. The transducer is positioned in a passage extending through the transducer housing. A torus-shaped cushion is positioned in the annular indent of the in-ear-canal adapter body.

It is desirable to provide a single piece speaker housing unit in which an entire speaker assembly is encapsulated into the housing unit to provide a submersible speaker and has low manufacturing costs.

SUMMARY OF THE INVENTION

The present invention is directed to a earbud housing apparatus and method of manufacture for entirely encapsulating a speaker assembly within a single unit earbud housing. The earbud housing apparatus includes a triple flange permanently fixed inside a multi-point inner ear lock for creating a hearing protection and sound adapter. The speaker assembly is encapsulated into an earbud housing. The hearing protection and sound adapter is permanently fixed to the speaker assembly for creating a complete earbud.

The speaker assembly can include base plate and a locking socket coupled to the center of the base plate. The base plate can have a disk shape. The locking socket can have a hollow tube shape. A speaker can be permanently coupled to the base plate to form a mounted speaker assembly. A cable guard can receive a speaker cable. The speaker cable can be attached to the speaker of the speaker assembly. The cable guard can be partially encapsulated into the earbud housing to enhance durability of the speaker cable.

During manufacturing, the mounted speaker assembly can placed inside a pair of housing molds. The housing molds are sealed and then injected with resin. After hardening of the resin, the hearing protection and sound adapter is permanently fixed to the locking socket of the speaker assembly for creating a single unit earbud housing apparatus.

The earbud housing apparatus is submersible in water in depths up to 50 feet without comprising operation of the mounted speaker assembly. The earbud housing apparatus is durable and wind resistant.

In one embodiment, a tip of the earbud housing is angled to reduce the size of the earbud housing. The reduced size earbud housing has the advantage of allowing the fitting of tight helmets over the earbud housing. The reduced size earbud housing also has the advantage of decreasing wind and water resistance.

The invention will be more fully described by reference to the drawings.

BRIEF DESCRIPTION OF THE DRAWINGS

Other advantages and features of the invention can be seen from the following description in which preferred embodiments of the invention are described in a non-limiting manner in reference to the attached drawings. In said drawings.

DETAILED DESCRIPTION OF EMBODIMENTS OF THE INVENTION

Figure 1:
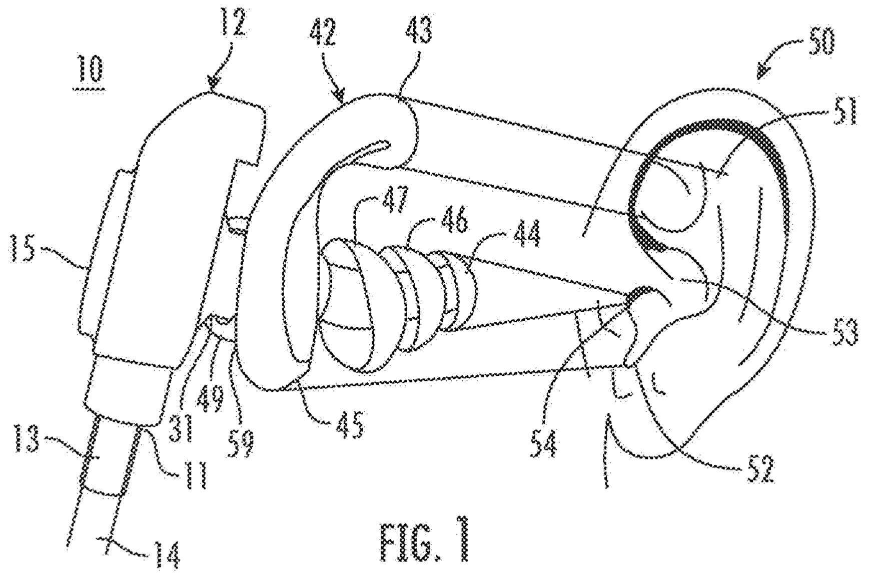
FIG. 1 is a schematic perspective diagram of an earbud housing apparatus during placement in a user's ear.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates earbud housing apparatus 10 in accordance with the teachings of the present invention. Cable guard 13 can extend from earbud housing 12. Upper portion 11 of cable guard 13 is encapsulated into earbud housing 12 to partially encapsulate cable guard 13. Cable 14 extends through cable guard 13. Cable guard 13 enhances durability of cable 14. Suitable materials for earbud housing 12 include rigid plastic such as polycarbonate, high density polyethylene, polyvinyl chloride, acrylonitrile-butadiene-styrene and epoxy. Suitable materials for cable guard 13 include heat shrinkable tubing, for example polyolefin, polyolefin tubing or polyvinyl tubing.

Figure 3:
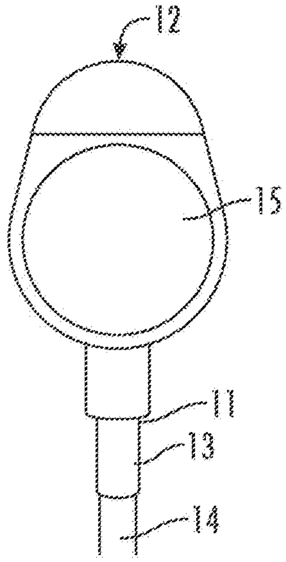
FIG. 3 is a side view of the earbud housing apparatus.

Display platform 15 can extend from earbud housing 12 as shown in FIG. 1 and FIG. 3. Display platform 15 can include indicia such as for example advertising of a customer's name or logo. In one embodiment, display platform 15 is a round extrusion. For example, display platform 15 can have a diameter in a range of about 5 mm to about 15 mm. In one embodiment, display platform 15 can have a diameter of about 13 mm.

Referring to FIG. 1, sound protector ear piece 42 is coupled to earbud housing 12. Sound protector ear piece 42 can include flanges 44, 46 and 47. Upper portion 43 is configured in a shape of upper ear portion 51. Lower portion 45 is configured in a shape of lower ear portion 52. During use, sound protector ear piece 42 contacts ear 50. Upper portion 43 of sound protector ear piece 42 can contact upper ear portion 51 of ear 50. Lower portion 45 of sound protector ear piece 42 can contact lower car portion 52. Flange 44 can contact car canal 53.

Figure 2A:
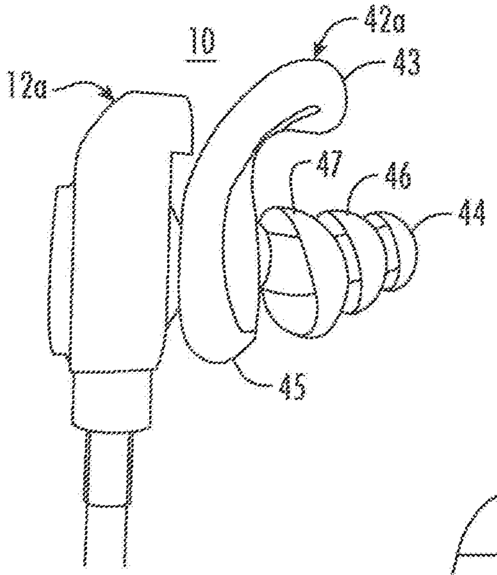
FIG. 2A is a front perspective view of earbud housing apparatus for use in a left ear of the user.
Figure 2B:
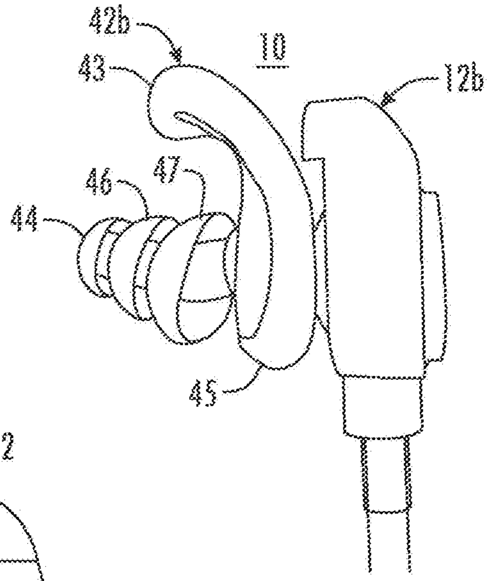
FIG. 2B is a front perspective view of earbud housing apparatus for use in a left ear of the user.

FIG. 2A illustrates earbud housing 12*a* and sound protector ear piece 42*a* for use in a left car. FIG. 2B illustrates earbud housing 12*b* and sound protector ear piece 42*b* for use in a right car.

Figure 4:
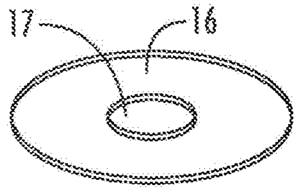
FIG. 4 is schematic diagram of a base plate used in the earbud housing apparatus.

FIG. 4 illustrates base plate 16. Base plate 16 can have a disc shape. Aperture 17 can be formed in the center of base plate 16. For example base plate 16 can have a diameter in a range of about 5 mm to about 15 mm and aperture 17 can have a diameter in a range of about 2 mm to about 10 mm. In one embodiment base plate 16 can have a diameter of about 10 mm and aperture 17 can have a diameter of about 4 mm.

Figure 5:
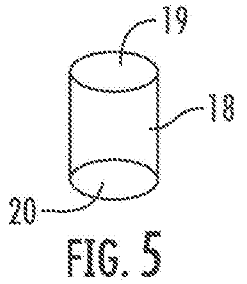
FIG. 5 is schematic diagram of a sound nozzle used in the earbud housing apparatus.
Figure 6:
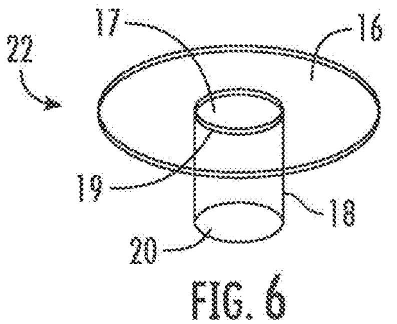
FIG. 6 is schematic diagram of a base plate assembly of the base plate and the sound nozzle used in the earbud housing apparatus.

FIG. 5 illustrates locking socket 18. Locking socket 18 includes top 19 and bottom 20. Locking socket 18 can have a hollow tube shape. For example locking socket 18 can be formed of aluminum. Locking socket 18 can have a diameter the same size as the diameter of aperture 17. For example, locking socket 18 can have a diameter in a range of about 2 mm to about 10 mm. In one embodiment, locking socket 18 can have a diameter of about 4 mm. Top 19 of locking socket 18 can be permanently coupled to base plate 16 adjacent aperture 17 to form base plate assembly 22 as shown in FIG. 6. For example, top 19 of locking socket 18 can be welded to base plate 16.

Figure 7A:
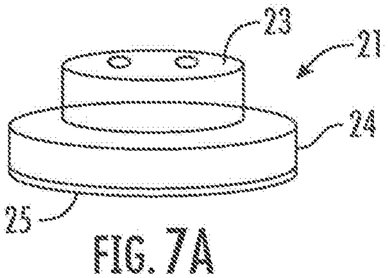
FIG. 7A is schematic diagram of a speaker assembly used in the earbud housing apparatus.

FIG. 7A illustrates speaker assembly 21. Speaker 23 is coupled to speaker base 24. Speaker base 24 includes bottom 25. Suitable materials for speaker base 24 include hard or rigid plastic or metal. Speaker base 24 can have a similar diameter as base plate 16. Speaker base 24 can have a diameter in a range of about 5 mm to about 15 mm. In one embodiment, speaker base 24 can have a diameter of about 10 mm.

Figure 8:
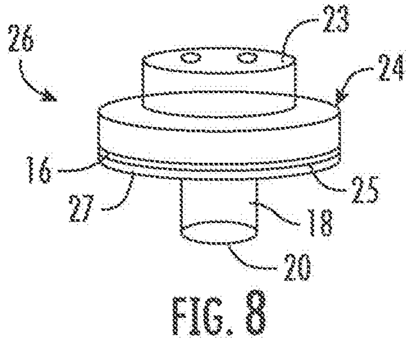
FIG. 8 is schematic diagram of the speaker assembly coupled to the base plate assembly to form a mounted speaker assembly and used in the earbud housing apparatus.
Figure 7B:
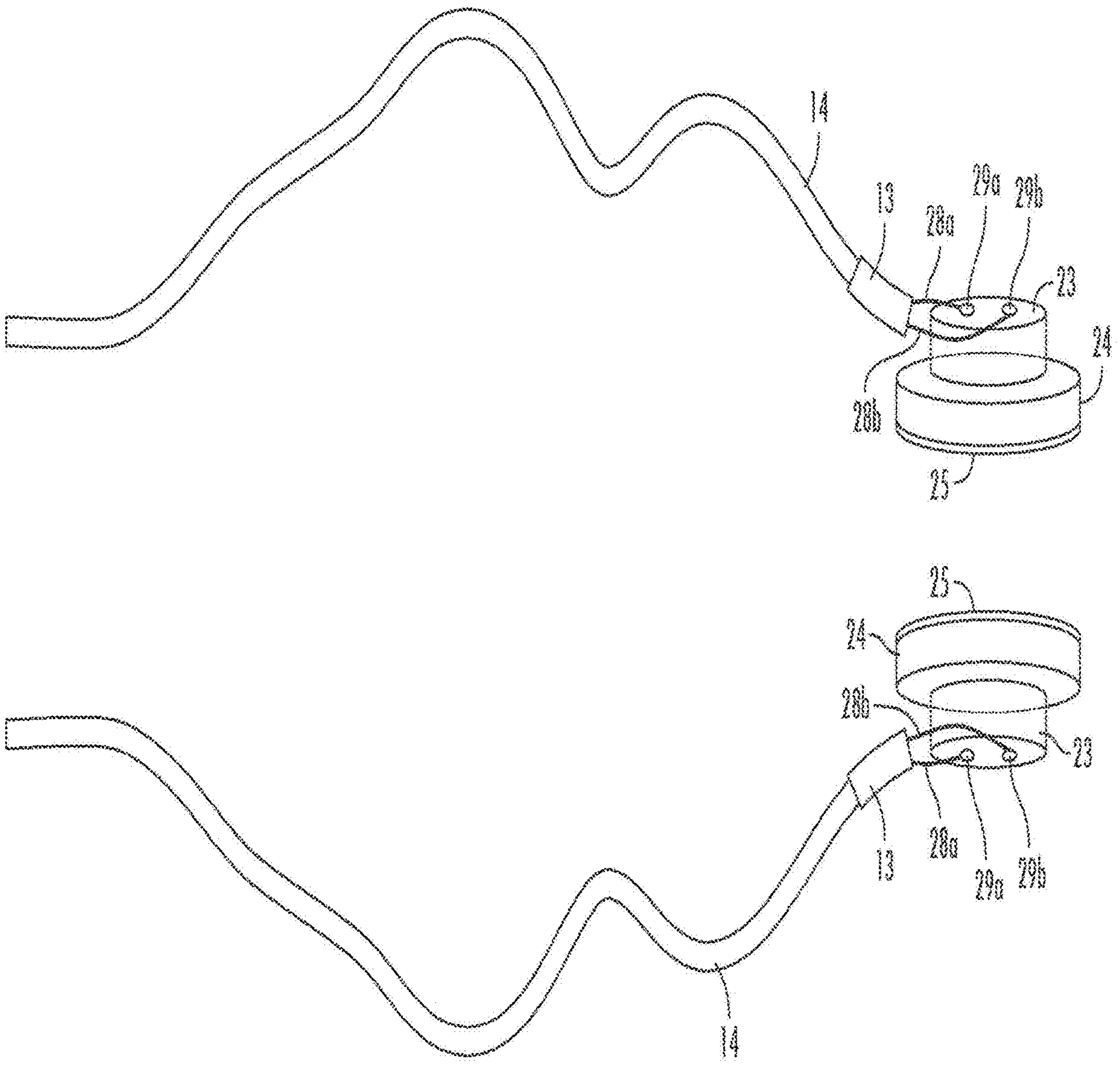
FIG. 7B is a schematic diagram of the speaker assembly shown in FIG. 7A attached to a cable.

FIG. 7B illustrates speaker assembly 21 attached to cable 14. Cable 14 is inserted through cable guard 13. Wire 28*a* of cable 14 is attached to contact 29*a* of speaker. Contact 29*a* can be used for audio. Wire 28*b* of cable 14 is attached to contact 29*b* of speaker 23. Contact 29*b* can be used for power. before mounted speaker assembly 26 is received in earbud housing 12. Bottom 25 of speaker 23 can be permanently coupled to bottom 27 of base plate assembly 22 to form mounted speaker assembly 26 as shown in FIG. 8.

Figure 9:
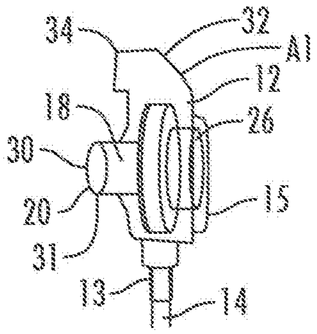
FIG. 9 is a schematic diagram of earbud housing used in the earbud housing apparatus.

Mounted speaker assembly 26 is encapsulated within earbud housing 12 as shown in FIG. 9. Cable 14 can be attached to speaker 23 and cable 14 extends through cable guard 13, as shown in FIG. 7B, before mounted speaker assembly 26 is received in earbud housing 12. Referring to FIG. 9, bottom 20 of locking socket 18 extends through aperture 30 of side 31 of earbud housing 12. Tip 32 of earbud housing 12 can be angled from top 34 at an Angle A1. For example Angle A1 can be in the range of about 30 degrees to about 45 degrees.

Figure 10:
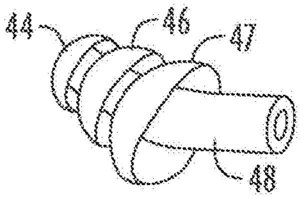
FIG. 10 is a schematic diagram of a flanged sound protector ear piece used in the earbud housing apparatus.
Figure 11:
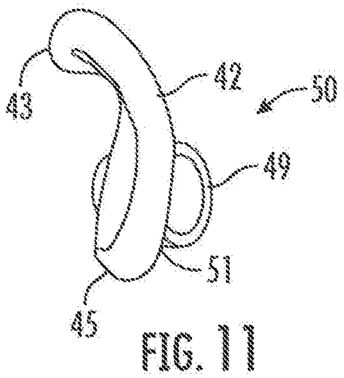
FIG. 11 is a schematic diagram of a multi-point inner ear mount used in the earbud housing apparatus.
Figure 12:
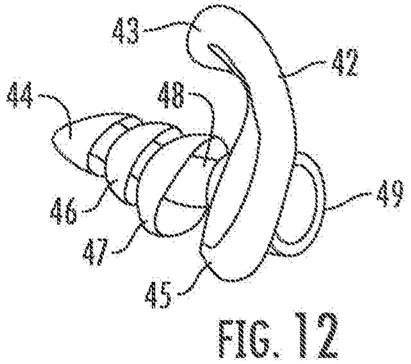
FIG. 12 is a schematic diagram of sound protector assembly of the flanged sound protector ear piece and the multi-point inner ear mount used in the earbud housing apparatus.

FIG. 10 illustrates sound protector car piece 42. Flanges 44, 46 and 47 are coupled to coupler 48. Multi-point inner car mount 50 is shown in FIG. 11. Coupler 49 extends from multi point inner car mount 50. Coupler 48 of sound protector car piece 42 is coupled to coupler 49 of multi-point inner car mount 50 as shown in FIG. 12. Sound protector car piece 42 and multi-point inner car mount 50 can be formed of a thermoplastic material. Sound protector car piece 42 can provide about 27 db hearing protection.

Coupler 49 extending at end 59 of multi point inner ear mount 50 is attached to side 31 of earbud housing 12 to form earbud housing apparatus 10 as shown in FIG. 1. Bottom 20 of locking socket 18 can be permanently attached to coupler 49 of multi point inner car mount 50. For example, an adhesive, such as a viscous high grade adhesive can be used to attach coupler 49 to bottom 20 of locking socket 18 and locking socket 18.

During manufacturing of earbud housing apparatus 10, locking socket 18 is permanently attached through aperture 17 in the center of base plate 16 to form to form base plate assembly 22 as shown in FIGS. 4-7B. Speaker assembly 21 is permanently coupled to base plate assembly 22 to form mounted speaker assembly 26 as shown in FIG. 8.

Figure 13A:
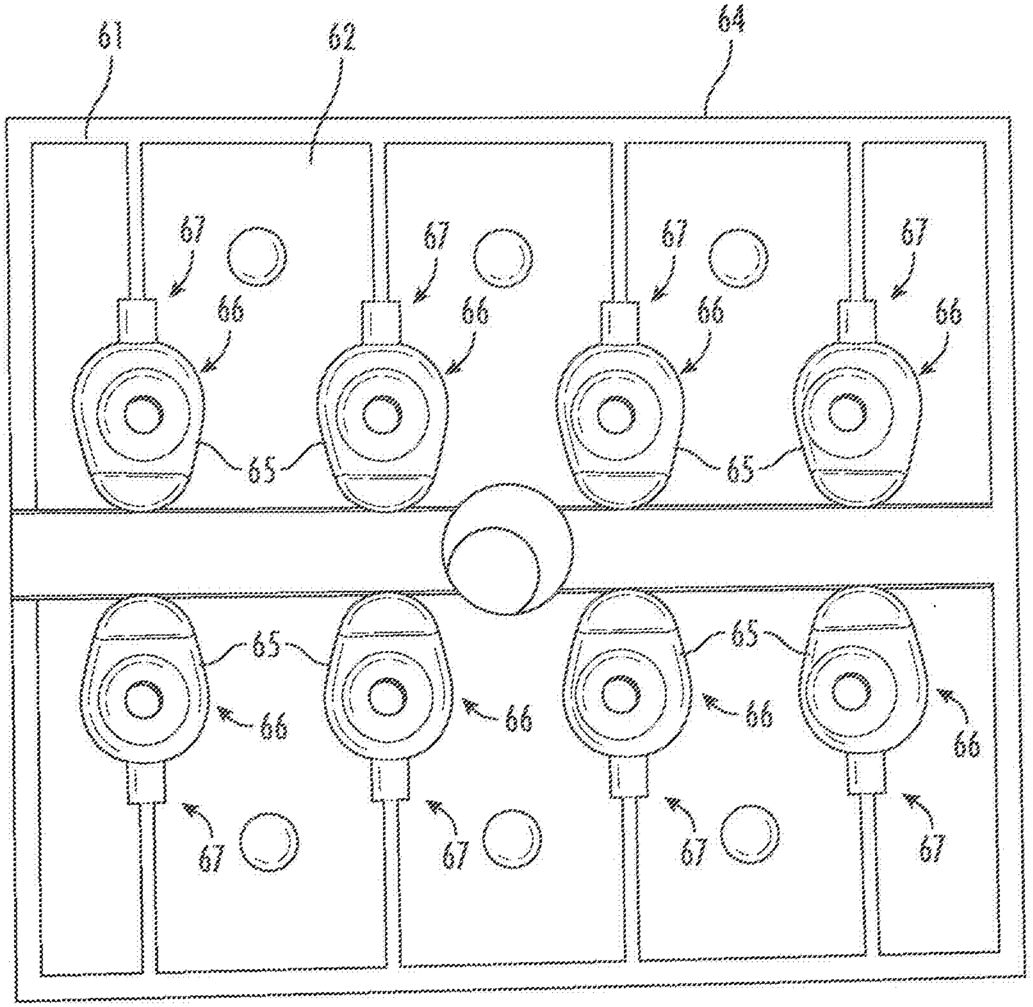
FIG. 13A is a schematic diagram of a bottom mold used in manufacture of the earbud housing apparatus.
Figure 13B:
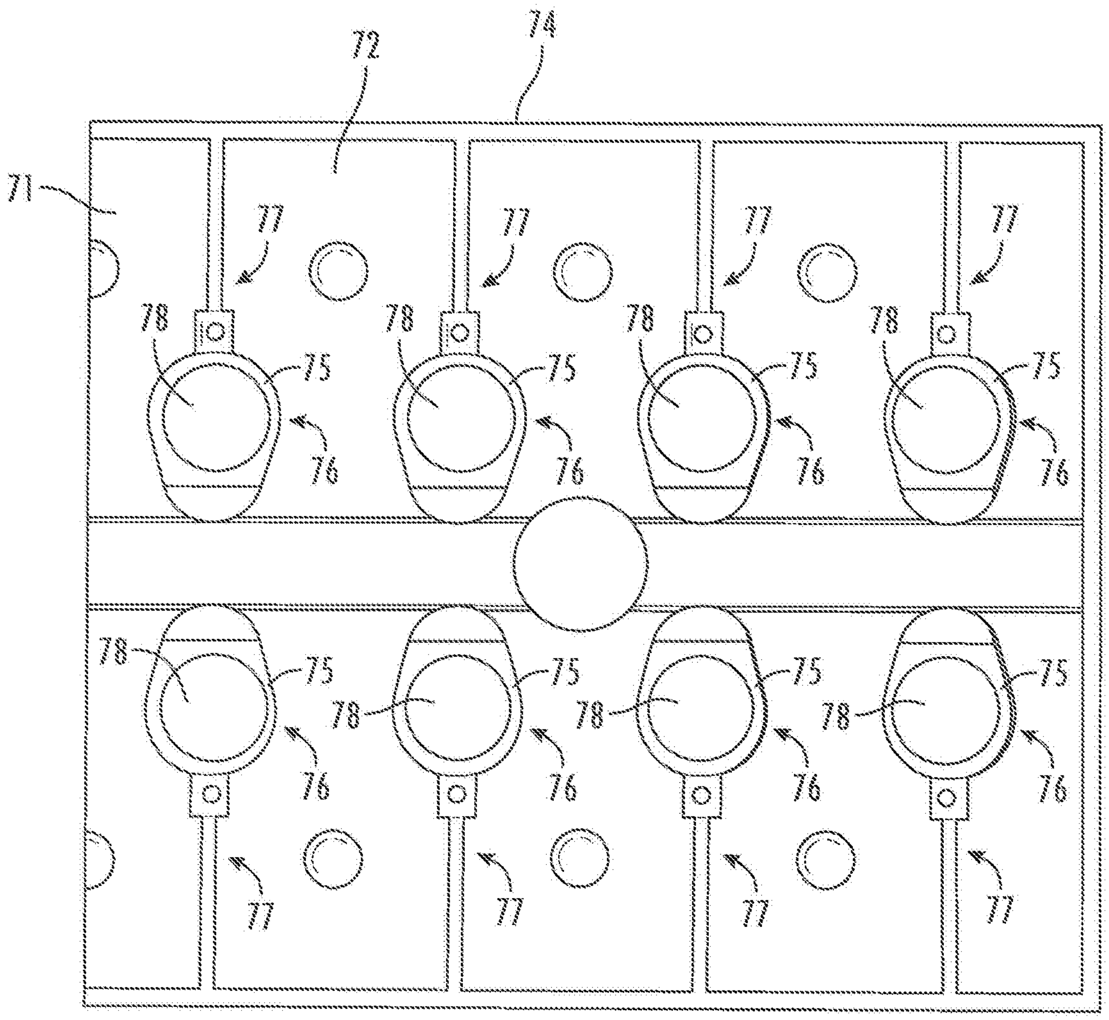
FIG. 13B is a schematic diagram of a top mold used in manufacture of the earbud housing apparatus.

Bottom mold 61 shown in FIG. 13A and top mold 71 shown in FIG. 13B can be combined to form a mold cavity. Bottom mold 61 includes top surface 62 and bottom surface 64. One or more cavities 65 are formed in bottom mold 61. One or more cavities 65 can include portion 66 formed in the shape of earbud housing 12 and portion 67 formed in the shape of cable guard 13 and cable 14. Opening 69 extends through bottom mold 61

Top mold 71 includes top surface 72 and bottom surface 74 as shown in FIG. 13B. One or more cavities 75 are formed in top mold 71. One or more cavities 75 include portion 76 and portion 77. Portion 77 is formed in the shape of cable guard 13 and cable 14. Portion 76 can include opening 78 to form a portion of earbud housing 12. Opening 78 can have a circular shape. Opening 79 extends through top mold 71

Figure 13C:
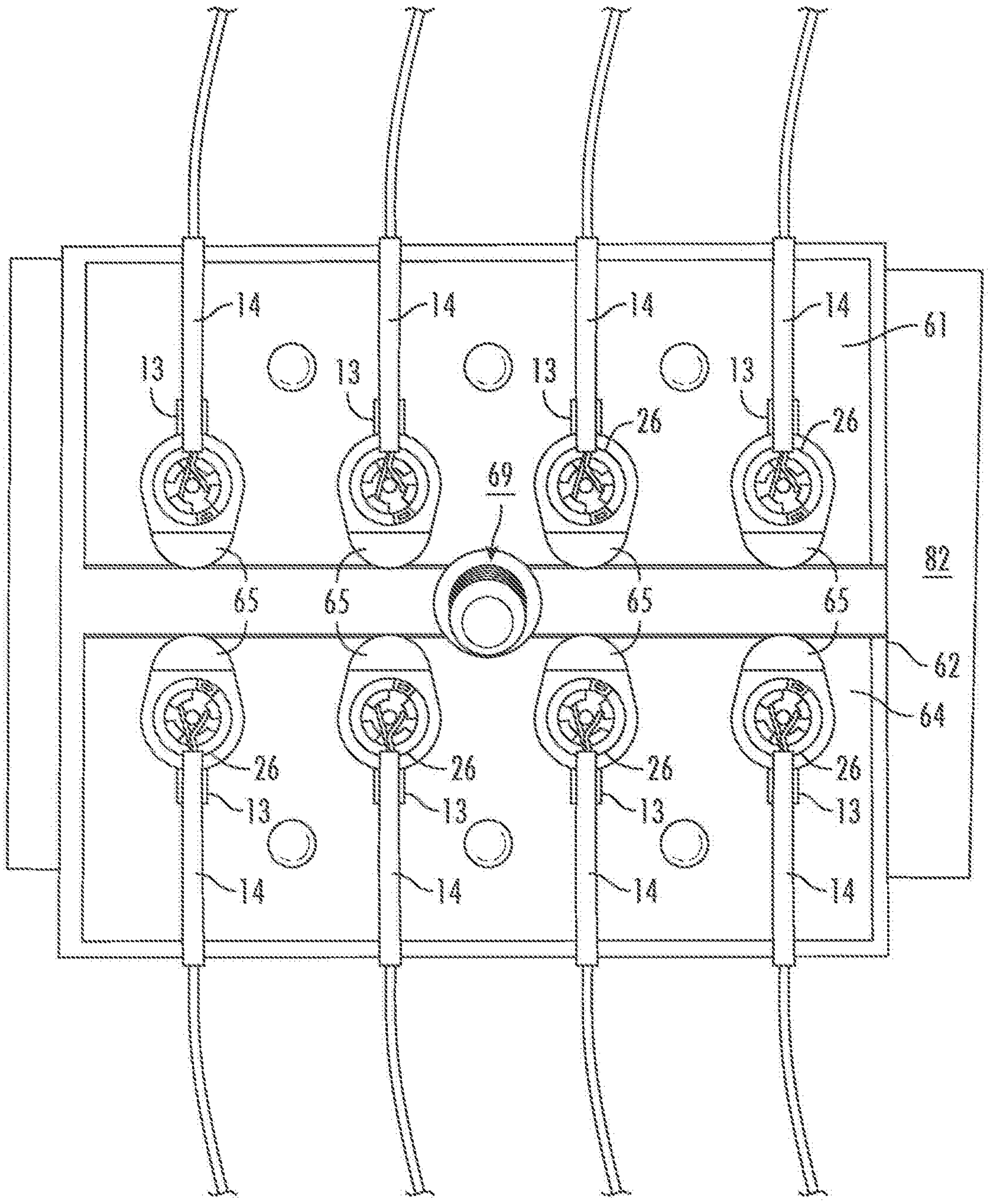
FIG. 13C is a schematic diagram of a mounted speaker assemblies placed in cavities of bottom mold.
Figure 13D:
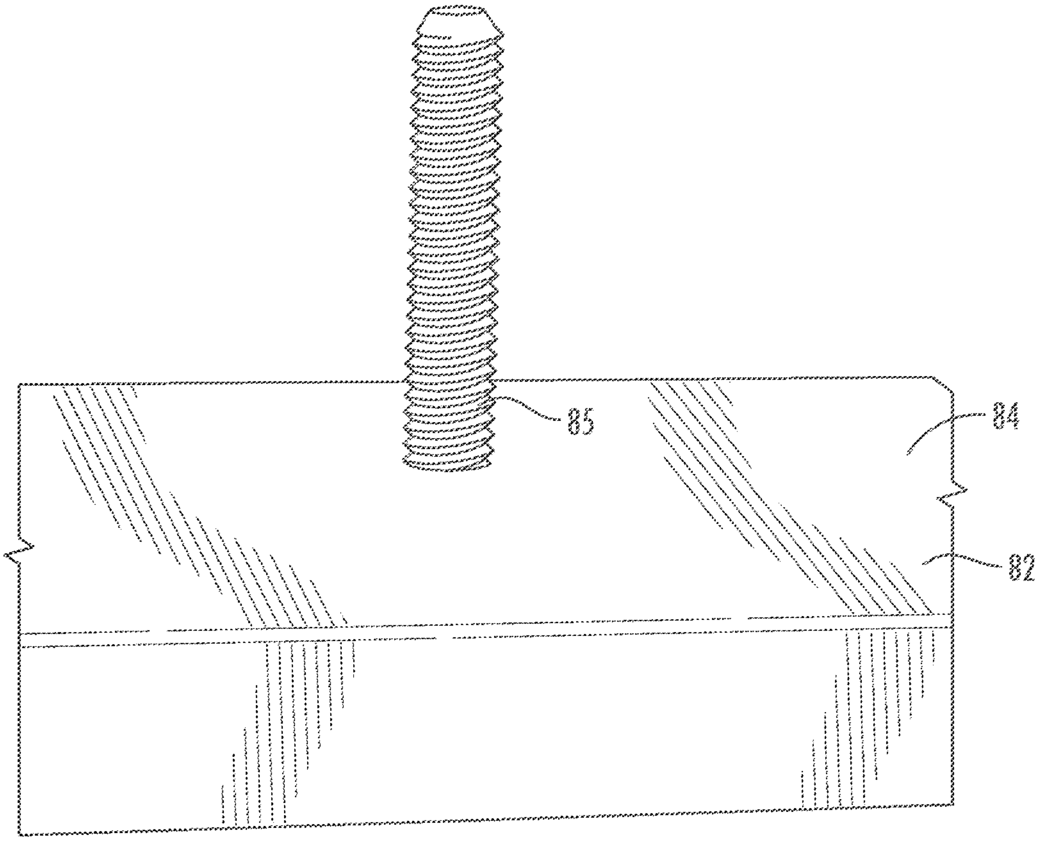
FIG. 13D is a schematic diagram of a base plate including a threaded bolt.

Mounted speaker assembly 26 including cable 14 extending through cable guard 13 is placed in respective cavities 65 of bottom mold 61 as shown in FIG. 13C. Base plate 82 is positioned underneath top surface 62 of bottom mold 61. Base plate 82 includes threaded bolt 85 extending from surface 84 of base plate 82 as shown in FIG. 13D. Threaded bolt 85 goes through opening 69 in bottom mold 61 and extends from bottom surface 64 as shown in FIG. 13C.

Figure 13E:
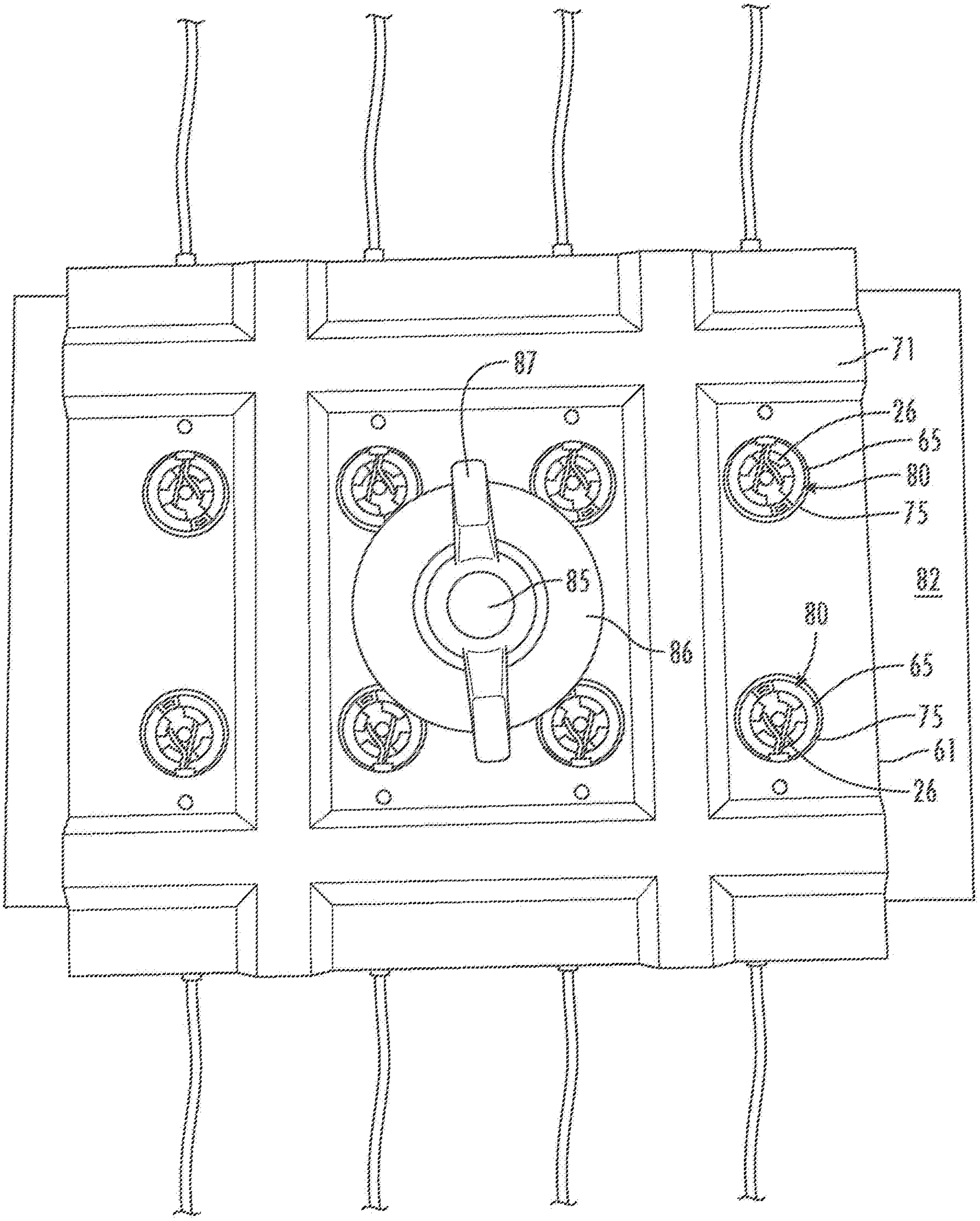
FIG. 13E is a schematic diagram of attachment of the top mold to the bottom mold using the threaded bolt from base plate attached with a washer and fastener.
Figure 13F:
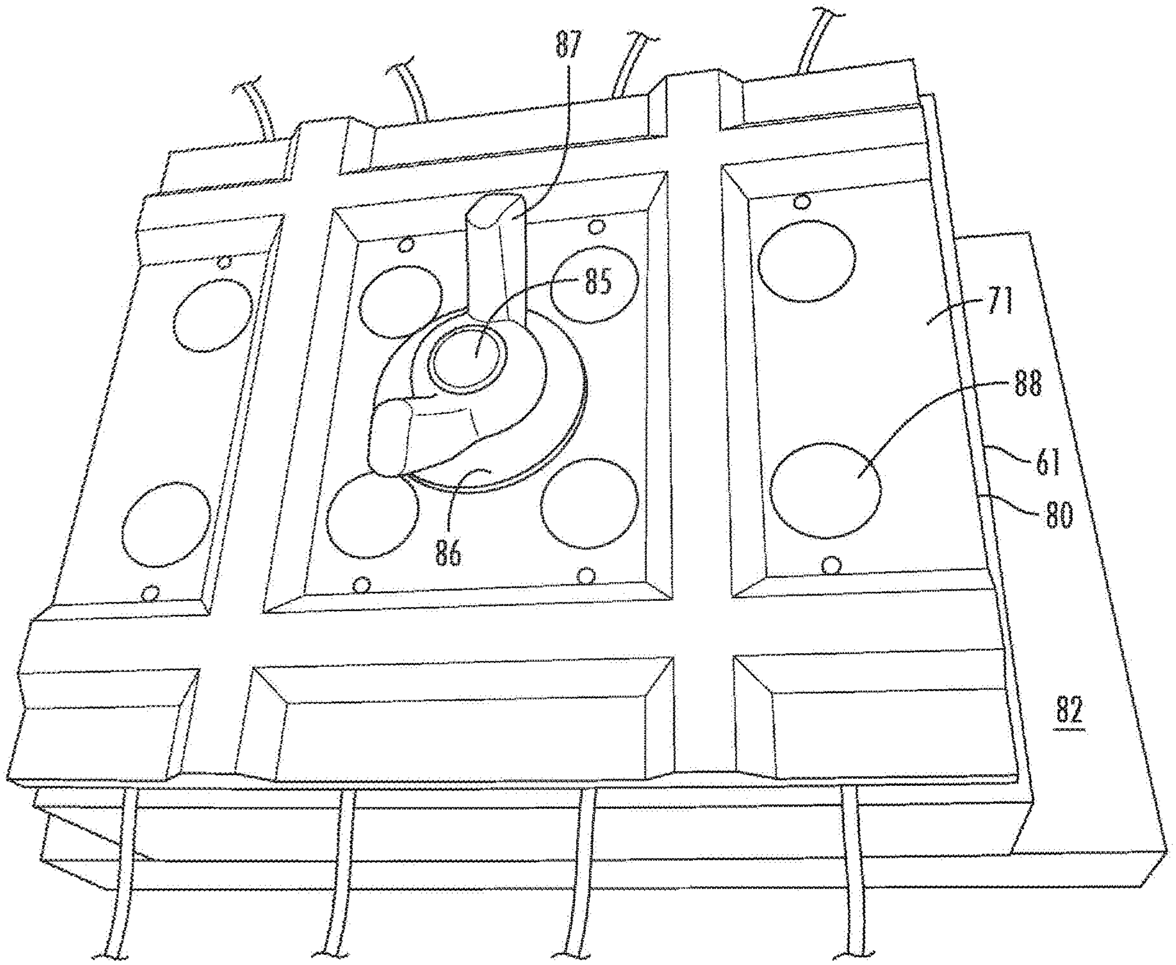
FIG. 13F is a schematic diagram after insertion of resin into the cavities formed between the top mold and the bottom mold.

Top mold 71 is placed over bottom mold 61 to align one or more cavities 65 of bottom mold 61 with one or more cavities 75 of top mold 71 to form completed respective one or more mold cavities 80 between one or more cavities 65 of bottom mold 61 and one or more cavities 75 of top mold 71 as shown in FIG. 13E. Threaded bolt 85 can extend through opening 79 in top mold 71 shown in FIG. 13B to be attached using washer 86 and fastener 87 as shown in FIG. 13E. One or more mold cavities 80 are injected with resin 88 as shown in FIG. 13F. Suitable materials for resin 88 include polypropylene, epoxy and liquid resins with a shore hardness of greater than 80D.

Figure 13G:
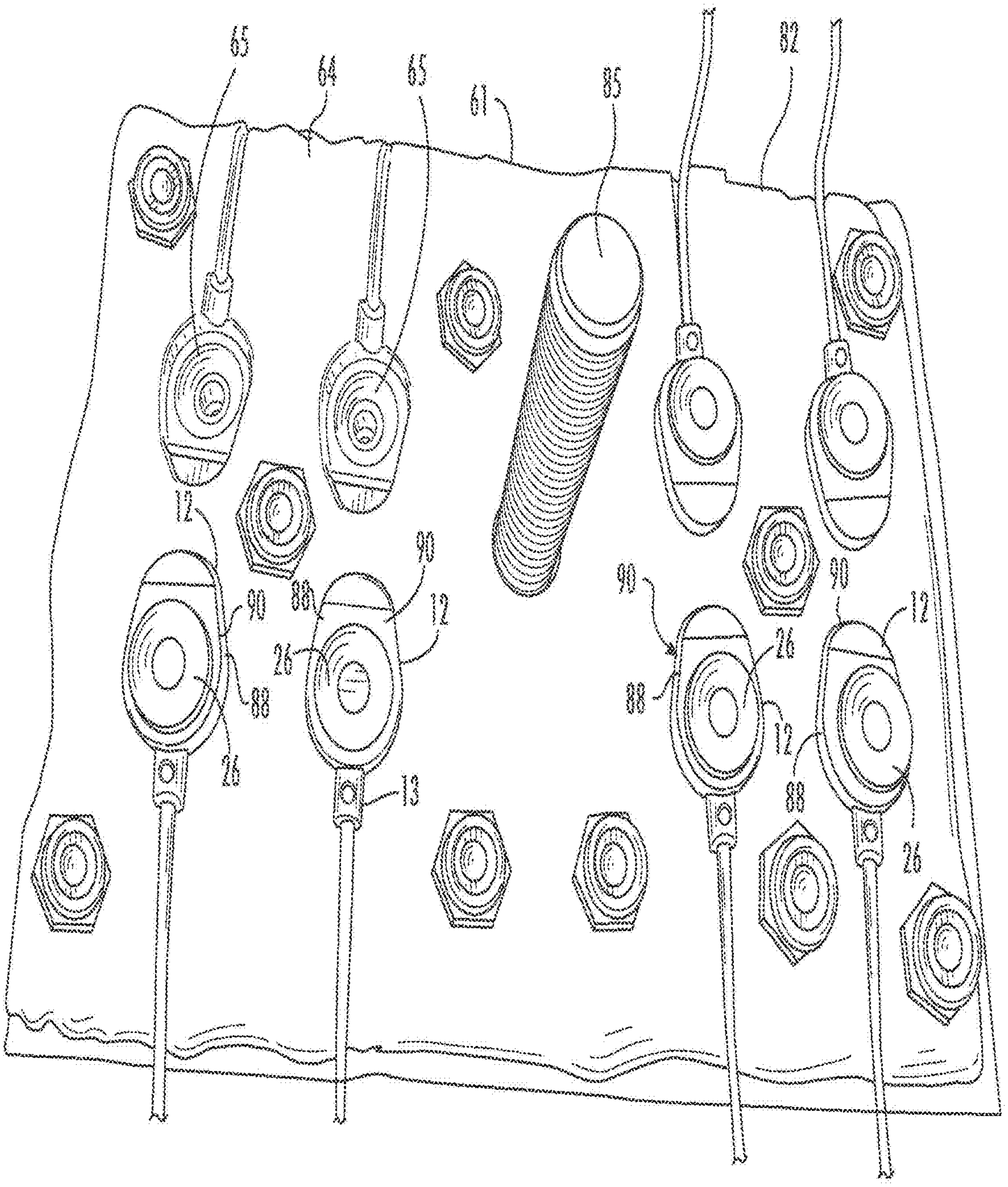
FIG. 13G is a schematic diagram of surface of the bottom mold of FIG. 13A after forming a plurality of earbud housings in the bottom mold.
Figure 13H:
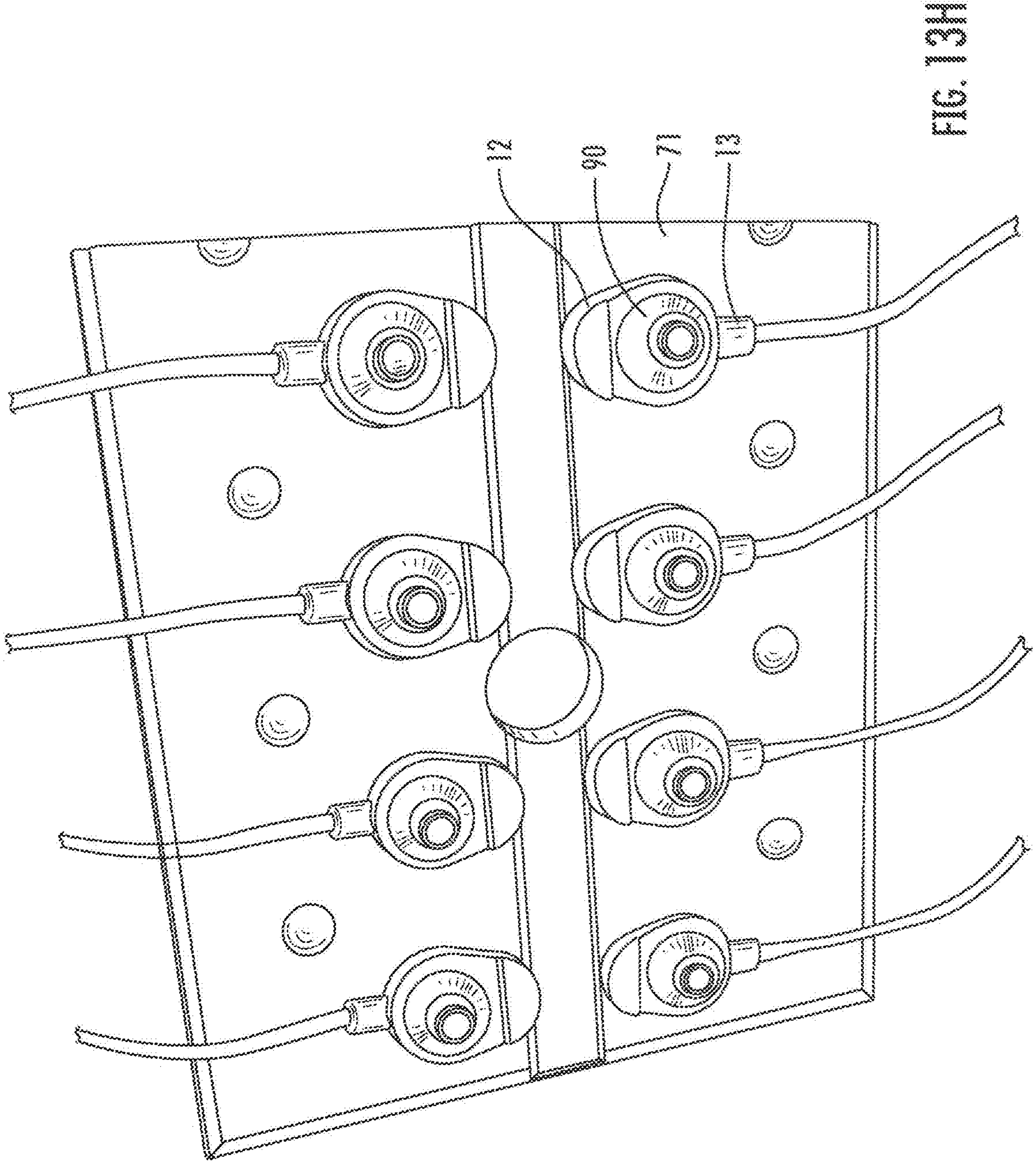
FIG. 13H is a schematic diagram of a surface of the top mold of FIG. 13B after forming of a plurality of earbud housings.

Resin 88 hardens to form earbud housing 12 as shown in FIGS. 13G and 13H. Portion 90 of earbud housing 12 is formed in cavity 65 of bottom mold 61 with resin 88 as shown in FIG. 13G. Portion 90 encases mounted speaker assembly 26 in earbud housing 12. Portion 90 of earbud housing 12 on top mold 71 with bottom mold 61 removed is shown in FIG. 13H. Bottom mold 61 and top mold 71 can be formed of silicone. Base plate 82 can be formed of metal. Earbud housing 12 is attached to sound protector ear piece 42 as shown in FIG. 1.

Figure 14:
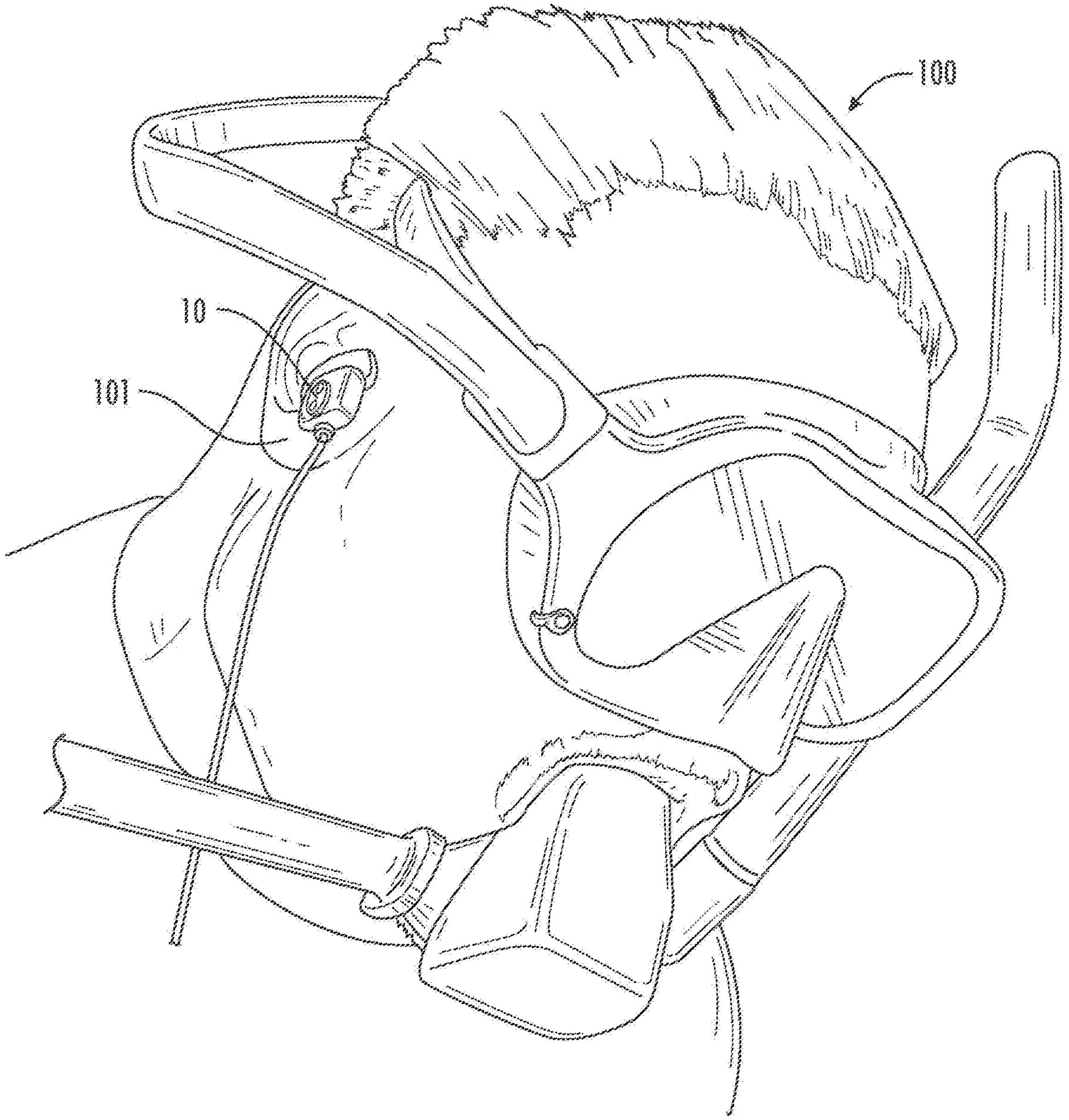
FIG. 14 illustrates aquatic testing and durability testing performed on the earbud housing apparatus.

Aquatic testing and durability testing was performed on earbud housing apparatus 10 as shown in FIG. 14. During aquatic testing, earbud housing apparatus 10 was worn by user 100 at a depth of 50 feet. Earbud housing apparatus 10 did not fail from or be destroyed by water damage while in ear 101 of user 100 at depths of 50 ft under water. The aquatic testing showed that earbud housing apparatus 10 can withstand a depth of 50 ft under water over 20 minutes. During durability testing, earbud housing apparatus 10 was placed on a level flat cement underneath each wheel of a 10 Ton forklift carrying a 10 lbs forklift in a center of each of the tires. Each wheel of the forklift ran over earbud housing apparatus 10. None of earbud housing apparatus 10 broke or failed.

The durability testing showed that earbud housing apparatus 10 can withstand being run over by at least 30,000 lbs. Earbud housing apparatus 10 was worn by a user in an indoor skydiving wind tunnel. Earbud housing apparatus 10 was functional in the indoor skydiving wind tunnel and comfortably fit the user's ears under a helmet.

The method for manufacturing earbud housing apparatus 10 has low manufacturing cost and is environmentally friendly in comparison to conventional methods of earbud production using large molten plastic injection machines.

What is claimed is:

1. An earbud housing apparatus comprising:
a single unit earbud housing;
a speaker assembly, the speaker assembly including a base plate, a speaker mounted to a first surface of the base plate and a locking socket coupled to a second surface of the base plate;
the single unit earbud housing encapsulating the speaker assembly with the locking socket extending from a first side of the single unit earbud housing; and
an inner ear lock coupled to the locking socket.

2. The earbud housing apparatus of claim 1 wherein the speaker assembly includes a cable attached to the speaker, a cable guard extending around at least a portion of the cable, wherein a portion of the cable guard is encapsulated by the single unit earbud housing.

3. The earbud housing apparatus of claim 1 further comprising a display platform extending from a second side of the single unit earbud housing, the display platform configured to receive indicia.

4. The earbud housing apparatus of claim 1 wherein the display platform is a round extrusion.

5. The earbud housing apparatus of claim 1 wherein the base plate has a disc shape and the locking socket is a hollow tube.

6. An earbud housing apparatus comprising:
an earbud housing, a tip of the earbud housing is angled from a top portion at an angle in a range of about 30 degrees to about 45 degrees;
a speaker assembly, the speaker assembly including a base plate, a speaker mounted to a first surface of the base plate and a locking socket coupled to a second surface of the base plate;
the earbud housing encapsulates the speaker assembly with the locking socket extending from a first side of the earbud housing; and
an inner ear lock coupled to the locking socket.

7. The earbud housing apparatus of claim 1 wherein the inner ear lock comprises a sound protector ear piece including a plurality of flanges extending circumferentially from a first coupler, the first coupler being attached to a multi-point inner ear mount, the multi- point inner ear mount including an upper portion configured in a shape of an upper ear portion and a lower portion configured in a shape of a lower ear portion, a second coupler extending from the sound protector ear piece, the second coupler being coupled to the locking socket.

8. The earbud housing apparatus of claim 1 wherein the single unit earbud housing is formed of one or more materials of rigid plastic, polycarbonate, high density polyethylene, polyvinyl chloride, acrylonitrile-butadiene-styrene and epoxy.

9. The earbud housing apparatus of claim 2 wherein the cable guard is formed of one or more materials of heat shrinkable tubing, polyolefin, polyolefin tubing or polyvinyl tubing.

10. The earbud apparatus of claim 7 wherein the sound protector ear piece and the multi-point inner ear mount are formed of a thermoplastic material.

11. A method for manufacturing at least one earbud housing apparatus comprising the steps of:
placing at least one speaker assembly in a respective at least one cavity of a bottom mold, the speaker assembly including a base plate, a speaker mounted to a first surface of the base plate and a locking socket coupled to a second surf ace of the base plate;
encapsulating the at least one speaker assembly in the respective at least one cavity in a material to form the at least one earbud housing apparatus of an at least one earbud housing encapsulating the at least one speaker assembly, the locking socket being accessible from a first side of the earbud housing; and
coupling an inner ear lock to the locking socket.

12. The method of claim 11 wherein the step of encapsulating the speaker assembly comprises:
placing a top mold over the bottom mold, the top mold having at least one cavities respectively corresponding to the at least one cavities of the bottom mold, to form at least one completed cavities between the bottom mold and the top mold;

coupling the bottom mold to the top mold; and inserting a resin into the at least one completed cavities.

13. The method of claim 12 wherein the step of coupling the bottom mold to the top mold comprises the steps of:

placing the bottom mold on a base plate, the base plate including a threaded bolt, the threaded bolt extending through an opening in the bottom mold and an opening in the top mold; and fastening the bottom mold to the top mold with using a fastener engaging the threaded bolt.

14. The method of claim 11 wherein the speaker assembly includes a cable attached to the speaker, a cable guard extending around at least a portion of the cable, wherein a portion of the cable guard is encapsulated by the earbud housing apparatus.

15. The method of claim 11 wherein a display platform extends from a second side of the earbud housing apparatus, the display platform configured to receive indicia.

16. The method of claim 11 wherein the base plate has a disc shape and the locking socket is a hollow tube.

17. The method of claim 11 wherein the inner ear lock comprises a sound protector ear piece including a plurality of flanges extending circumferentially from a first coupler, the first coupler being attached to a multi-point inner ear mount, the multi-point inner ear mount including an upper portion configured in a shape of an upper ear portion and a lower portion configured in a shape of a lower ear portion, a second coupler extending from the sound protector ear piece, the second coupler being coupled to the locking socket.

18. The method of claim 1 the step of encapsulating comprising using a resin formed of one or more materials of rigid plastic, polycarbonate, high density polyethylene, polyvinyl chloride, acrylonitrile-butadiene-styrene and epoxy.

19. The method of claim 14 wherein the cable guard is formed of one or more materials of heat shrinkable tubing, polyolefin, polyolefin tubing or polyvinyl tubing.

20. The method of claim 17 wherein the sound protector ear piece and the multi-point inner ear mount are formed of a thermoplastic material.

* * * * *